United States Patent [19]
Testone et al.

[11] Patent Number: 5,110,324
[45] Date of Patent: May 5, 1992

[54] ELECTROSTATIC SEPARATION METHOD AND APPARATUS

[75] Inventors: Anthony Q. Testone, Schwenksville, Pa.; Waldyn J. Benbenek, Conroe, Tex.

[73] Assignee: Louisiana Pacific Corporation, Conroe, Tex.

[21] Appl. No.: 456,148

[22] Filed: Dec. 27, 1989

[51] Int. Cl.$^5$ .............................................. B03C 3/00
[52] U.S. Cl. ........................................... 55/11; 55/13; 55/14; 55/109; 55/113; 55/121; 55/135; 55/149; 55/152
[58] Field of Search ..................... 55/5, 10, 11, 13, 14, 55/109, 113, 114, 121, 134, 135, 149, 152, 154, 155

[56] References Cited

U.S. PATENT DOCUMENTS

| | | | |
|---|---|---|---|
| 1,473,806 | 11/1923 | Bradley | 55/135 |
| 1,575,165 | 3/1926 | Hopkinson | 55/13 |
| 2,911,061 | 11/1959 | Petersen | 55/134 |
| 3,581,468 | 6/1971 | Gourdine et al. | 55/114 |

FOREIGN PATENT DOCUMENTS

| | | | |
|---|---|---|---|
| 3418112 | 11/1985 | Fed. Rep. of Germany | 55/114 |
| 3832879 | 4/1989 | Fed. Rep. of Germany | 55/121 |
| 136464 | 12/1919 | United Kingdom | 55/10 |

*Primary Examiner*—Bernard Nozick
*Attorney, Agent, or Firm*—Mason, Fenwick & Lawrence

[57] ABSTRACT

An apparatus for removing gaseous hydrocarbon fraction from a heated gas comprises a cooled air inlet to condense the hydrocarbon to viscous liquid particles. An electrostatic field established between a points array and a plate propels the particles to a moving non-conductive collector belt, from which the liquid condensate is removed by a doctor blade and deposited into a heated receiver trough. The liquid condensate is discharged from the receiver trough into a container. A method comprises passing a heated gaseous, liquid droplet-containing stream through an electrostatic field which propels the droplets to a liquid collector, and removing the liquid from the collector, and discharging the liquid into a container for disposal.

20 Claims, 3 Drawing Sheets

ELECTROSTATIC SEPARATION METHOD AND APPARATUS

BACKGROUND OF THE INVENTION

The present invention relates to an apparatus including an electrostatic precipitator, which is used for removing contaminants from a heated gas stream and to a related method.

In a number of industrial processes, it is recognized that the gaseous effluent from the processing steps contains unsatisfactorily large amounts of contaminants. For example, in the production of particle board, the product is heated by combustion gases resulting from a wood fire, the effluent gas containing substantial quantities of gaseous hydrocarbon fractions.

In past years, the exhaust gases were simply discharged to atmosphere, without treatment. More recently, several solutions for exhaust treatment have been proposed. One has been to inject additional fresh air into the exhaust gases, to reduce the concentration of the contamination. Since this did not reduce the total amount of contaminants discharged into the atmosphere, this procedure has been found to be unsatisfactory.

In another proposal, effluent gases were passed through passages between relatively cold stones. It was found, however, that while the cold stones removed contaminants by condensing them, the liquid contaminant was then accumulated on the stones, and over time blocked the passages, requiring that the stones be cleansed of the contaminants. This suggestion, also, proved to be unsatisfactory because of the expenses involved in cleaning the accumulated contaminants which had been deposited on the stones, as well as because the process became less efficient as more and more contaminant material was deposited onto the stones, or onto contaminant already in place on the stones.

SUMMARY OF THE INVENTION

The present invention provides an apparatus and method for removing contaminants from a heated stream of gaseous material. Where the heated gaseous stream contains a gaseous contaminant, such as a gaseous hydrocarbon fraction having a condensation point lower than the condensation point of other parts of the gaseous stream, means are provided for introducing refrigerated air into the heated steam, to reduce its temperature, causing the contaminant fraction to condense. The condensed hydrocarbons form liquid droplets, i.e., particles of liquid condensate, which may have a higher viscosity than water, such as a viscosity approaching those of various oils, depending on temperature and the particular hydrocarbon condensed. The gaseous stream with liquid condensate particles or droplets moves along a path which is bounded by at least one moving belt, and an electrostatic field is provided in this path, having lines of force extending generally transversely of the path of movement of the gaseous stream. Thus, the electrostatic field impels the particles to the belt. The electrostatic field is provided by an array of electrostatic points positioned in the stream path, and by a plate which is behind the run of the belt, and which is at a lower potential than the points of the array.

The belt is supported by rollers and moved continuously, and a heated doctor blade is provided adjacent one roller to remove liquid contaminant from the belt, and to deposit it into an insulated and heated trough, which maintains the contaminant in liquid form. Liquid contaminant is discharged from the trough, and may be received in individual containers which are sequentially filled, for subsequent disposal.

Among the objects of the present invention are to provide an apparatus for removing gaseous contaminants effectively and economically.

Another object of the present invention is the provision of an apparatus and method for this purpose which provides for the continuous removal of gaseous contaminants from a heated gas stream containing such contaminants on a continuous basis.

Yet another object of the present invention is to provide for removal of contaminants from a heated gaseous stream on a continuous basis, by collection of liquid contaminant particles and the cleansing of significant parts of the apparatus on a continuous basis.

Other objects and many of the attendant advantages of the present invention may be readily understood from the following specification, drawings and claims.

DESCRIPTION OF THE PREFERRED EMBODIMENT

Figure 1:
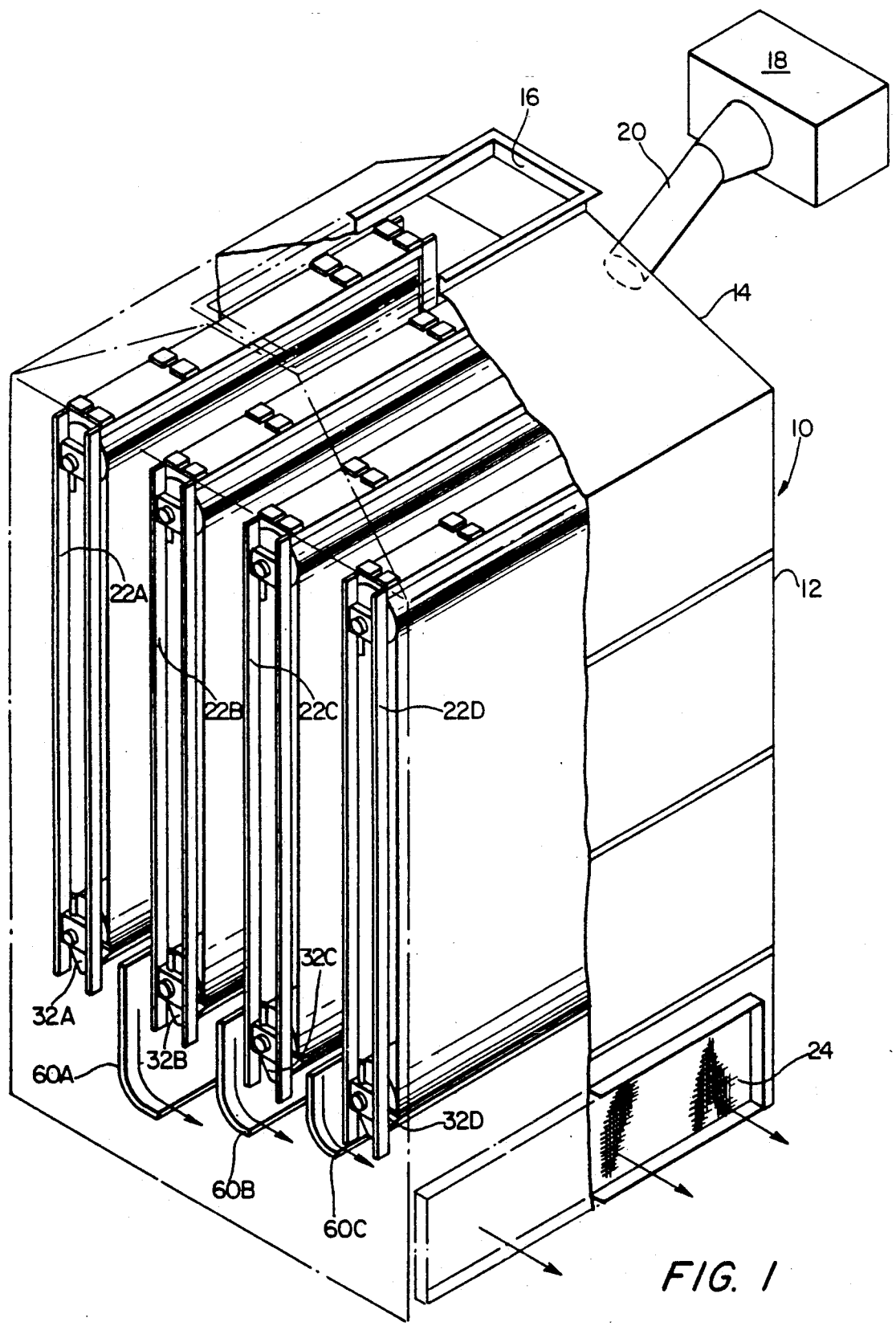
FIG. 1 is a perspective view of an apparatus in accordance with the present invention, with parts in phantom lines.

Referring now to the drawings, wherein like or corresponding reference numerals are used to designate like or corresponding parts throughout the several views, there is shown in FIG. 1 a perspective view of an apparatus 10 in accordance with the present invention, which includes a housing 12, partly shown in phantom line. The housing 12 may be of known sheet metal construction, being generally rectangular in horizontal cross-section, and having generally vertically extending sidewalls. At the top is an inlet hood 14 having an inlet opening 16 for receiving a stream of moving gas, such as the effluent from a kiln, which contains air and contaminants such as hydrocarbons in the gaseous state. These gaseous hydrocarbons are a fraction or fractions of the heated stream which are atmospheric contaminants and which are to be removed by the present apparatus 10.

For introducing cooling air into the incoming heated gaseous stream, there is provided an air conditioner 18, such as a five ton air conditioner, and a conduit 20 for discharging cooling air into the hood 14. As will be understood, although a single conduit 20 is disclosed, one or more conduits 20 may be used to connect air conditioner 18 or one of a plurality of such air conditioners, to the hood 14. This reduces the temperature of the flowing ga stream, and since the hydrocarbon fractions under consideration have a condensation point which is lower than that of other components of the gaseous stream, this hydrocarbon contaminant fraction is continuously condensed to form liquid particles or droplets. The term "liquid" as used herein refers, in the present example, to hydrocarbon in liquid form which may have a viscosity such as that of water, or a substantially higher viscosity or range of viscosities, as in various hydrocarbon oils.

Within the housing 12 are a plurality of belt assemblies 22A-22D. Beneath each belt assembly 22A-22D, there is a heated, insulated receiving trough 32A-32D. There are also provided a plurality of baffles 60A, 60B and 60C for directing the gaseous streams from a vertical direction to a horizontal direction, so that the cleansed gas thereby exits through an outlet opening 24 in the housing 12. There are not shown in FIG. 1 means for establishing an electrostatic field, which are disclosed in FIG. 2, to which reference is now made.

Figure 2:
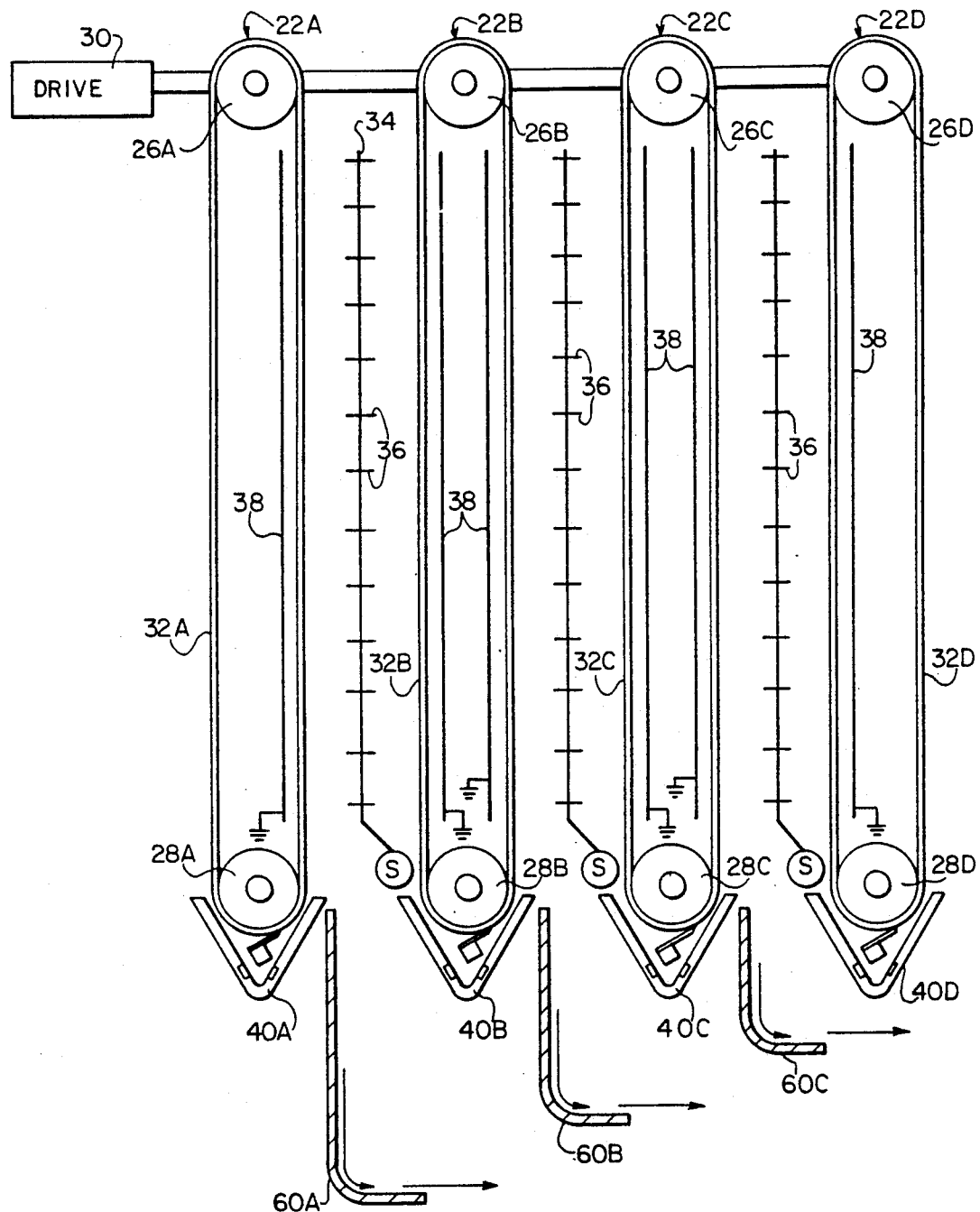
FIG. 2 is a partly schematic elevational view, with parts in section, showing the electrostatic precipitator and related parts.

Each of the belt assembles 22A-22D is substantially identical and comprises a supporting framework, not shown in FIG. 2. Each of the belt assemblies includes an upper roller 26A-26D and a lower roller 28A-28D, one or both of which is driven by any suitable means, as is well known in the art. Driving may be by a suitable drive motor 30, connected in known manner, such as by gears and sprocket chains, to the rollers 26A-26D.

Extending about each of the rollers 26A-26D and 28A-28D is a belt 32 which is preferably of woven fiberglass fabric coated with Teflon. Thus, belt 32, a standard article of commerce, is non-conductive, and has a surface resistivity greater than $10^{20}$ ohms per square.

As will be seen, each of the belts 32 comprises two runs, which provide, except for the outer runs of belts 32A and 32D, the boundaries of a flow path for the gas with liquid contaminant droplets or particles therein, the gas flowing downwardly in three separate paths between the four belt assemblies 22A-22D. In each of these paths, there is an electrostatic grid 34 with arrays of points 36 extending generally horizontally, and there being points 36 extending in opposite directions, some points extending towards a run of one belt and other points extending towards a run of the other belt bounding or adjacent to the flow path of the contaminant-bearing gas. Behind each of the runs of the belt which defines a part of a flow path is conductive a plate 38. The electrostatic grid is coupled, in each case, to a source S of high voltage current, so that the points 36 are at a significantly higher potential than are the plates 38.

Between the points 36 and the plates 38, there is established an electrostatic field, having lines of force which are directed from the points 36 of an array towards one of the plates 38, thereby to propel by electrostatic force droplets of liquid contaminant towards the adjacent runs of the belts 32A-32D. The liquid contaminant adheres to the non-conductive belt 32A-32D, and is carried to a removal and accumulating apparatus 40A-40D. Also shown in FIG. 2 are the baffles 60A, 60B and 60C, each of which except baffle 60A has a vertical leg which is somewhat shorter than the vertical leg of the baffle to the left of it, so that there are provided three streams of cleaned air, one above the other, in the stream flowing to the outlet of the apparatus.

Figure 3:
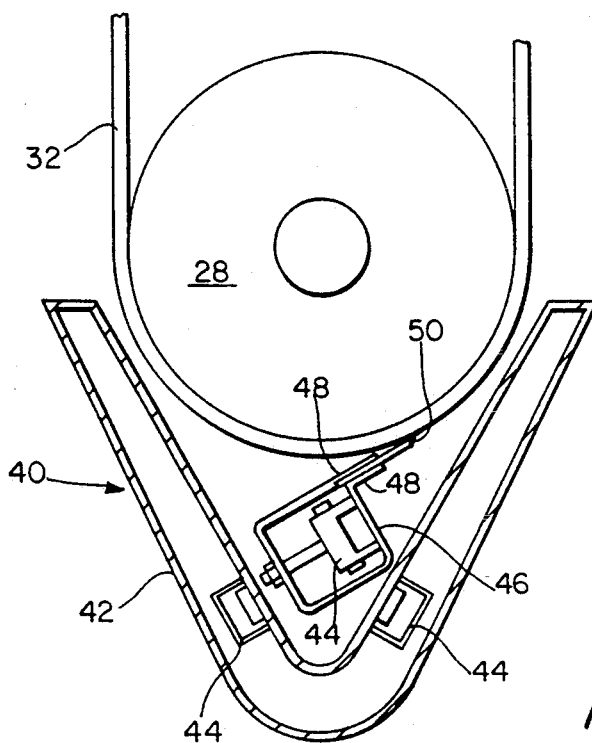
FIG. 3 is an enlarged elevational view showing a portion of a moving belt, a doctor blade and a receiving trough.

Referring now to FIG. 3, there is shown to an enlarged scale, the removal and accumulating apparatus 40. A lower or bottom roller 28 has a belt 32 trained around it. There is also shown an upwardly facing, V-shaped double wall trough 42, the double walled construction providing an insulated trough structure. Within the walls of the trough 42 are a pair of electrical heaters 44, such as heaters sold under the trade name CAL-ROD. Within the trough 42 is a box-beam 46, within which is a further CAL-ROD heater 44. Attached to the box-beam 46, which is of metal, are a pair of metal plates 48 which clamp between them a doctor blade 50, preferably made of Teflon, and set to substantially engage the collection surface of the collection belt 32 so as to scrape or remove from the belt 32 liquid contaminant which is thereon. The liquid contaminant is received in the receiving trough 42, and is maintained heated, and therefore in liquid state, by the three heaters 44 in the trough 42.

Figure 4:
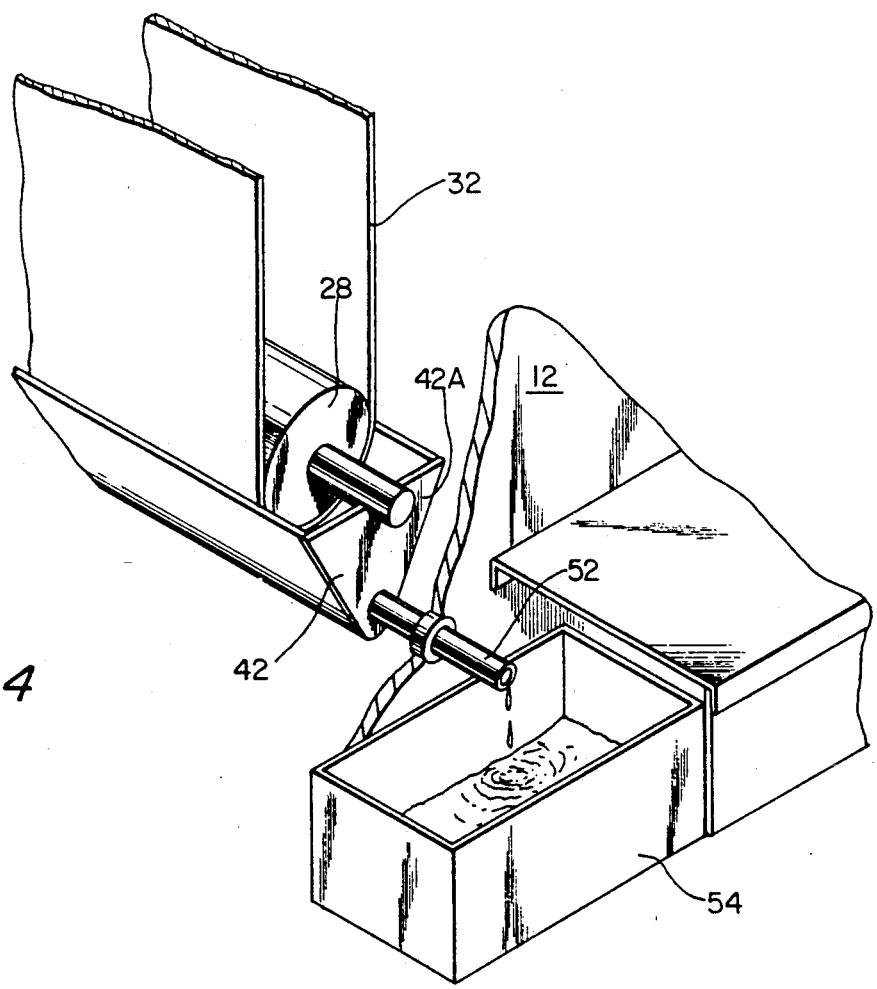
FIG. 4 is a perspective view of a receiving trough and a discharge conduit.

FIG. 4 shows a roller 28, a part of belt 32, and trough 42, including specifically an end plate 42A which has a discharge pipe 52 extending from it to enable liquid contaminant to be discharged from the trough 42. The liquid contaminant is preferably received in a vessel such as a box 54, which may be lined with a plastic liner, not shown.

The preferred embodiment of the apparatus, as hereinabove disclosed, is of substantial size, able to remove contaminants such as hydrocarbons from a gas flow of approximately 53,495 cubic feet per minute, the gas having a velocity of 73.2 feet per second. The air conditioner will lower the temperature of the gas from approximately 280°-310° F., the discharge temperature of the gas will be to approximately 180°-194° F. The electrostatic point array or grid will have an extent of approximately 6'×9', and will contain 3413 points. A negative voltage of 100,000 volts may be applied to the grid, at five milliamps; the plate 38 is grounded. Alternatively, there could be a voltage of 50,000 volts negative applied to the grid, and a positive voltage of 50,000 volts applied to the plate.

In the preferred embodiment, in which the apparatus runs continuously, there are 44,000 square inches of surface of the belts, and there will be collected 12.78 pounds of condensate per hour, the density being approximately 10 pounds per gallon. Consequently, there can be obtained some 25 gallons of liquid hydrocarbon contaminant per day extracted from the discharge gases, as from a kiln.

In an alternate embodiment, the (ground) plates may be eliminated, and the belts may be of fiberglass material, Teflon coated, the Teflon coating being impregnated with carbon black, so as to make the belts as a whole conductive.

The claims and the specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

What is claimed is:

1. A method for removing liquid contaminant particles from a gaseous stream comprising:

passing said stream through a housing having an inlet and an outlet, generating an electrostatic field in said housing extending transversely of said gaseous stream between an array of points in aid stream connected to a source of voltage and a conductive plate spaced from said array of points, with said field having lines of force extending from said array of points to said conductive plate, collecting liquid contaminant particles impelled by said lines of force on a collection surface adjacent said stream and located between said array of points and said conductive plate, causing said collection surface to be moved by a driving apparatus, and removing liquid contaminant collected on said moving collection surface from said moving collection surface.

2. The method of claim 1, and further comprising accumulating the removed liquid contaminant.

3. A method of removing a gaseous fraction from a gaseous stream by condensation and precipitation and utilizing electrostatic forces, comprising:

reducing the temperature of a moving gas stream which comprises at least one fraction having a lower dew point than other fractions of the stream to a temperature at or below the dew point temperature of said one fraction to thereby cause said one fraction to condense as liquid droplets, establishing an electrostatic field in a housing extending between an array of points connected to a source of voltage and located in said moving gas stream and a conductive plate, said electrostatic field having lines of force extending transversely of said path of said moving gas stream, passing the said moving gas stream with said liquid droplets therein into said housing through an inlet past said array of points and through said electrostatic field to thereby move said liquid condensate droplets transversely of said path of movement of said gaseous stream, collecting liquid droplets propelled by said electrostatic field on a non-conductive surface located between said array of points and said conductive plate, causing said non-conductive surface to be moved by a driving apparatus, and passing said moving gas stream out of said housing through an outlet.

4. The method of claim 3, and further comprising removing liquid contaminant deposited on the moving non-conductive surface.

5. Apparatus for removing a gaseous fraction from a gaseous stream by condensation, and for accumulating the resulting xondensate comprising:

means for reducing the temperature of a moving gas stream comprising at least one fraction having a lower dew point than other fractions of the stream to a temperature at or below the dew point temperature of said one fraction to thereby cause said fraction to condense as liquid droplets, a housing comprising inlet means for admitting said moving gas stream and droplets and outlet means for discharging said gas stream, said gas stream having a path of movement in said housing between said inlet means and said outlet means, means in said housing for establishing an electrostatic field having lines of force extending transversely of said path of movement for moving said liquid condensate droplets transversely of said path of movement of said gaseous stream comprising an array of electrostatic points connected to a source of voltage and a conductive plate spaced from said points array, means for collecting liquid droplets propelled by said electrostatic field comprising a non-conductive belt between said points array and said plate, and means for moving said non-conductive belt.

6. The apparatus of claim 5, and further comprising means for removing liquid from said belt.

7. The apparatus of claim 6, said last mentioned means comprising a doctor blade.

8. The apparatus of claim 7, and further comprising means for heating said doctor blade.

9. The apparatus of claim 7, and further comprising means for receiving liquid removed from said belt by said doctor blade.

10. The apparatus of claim 9, said receiving means comprising a trough beneath said doctor blade.

11. The apparatus of claim 10, and further comprising means for thermally insulating said trough.

12. The apparatus of claim 11, and means for discharging liquid condensate from said trough.

13. Apparatus for removing a gaseous fraction from a gaseous stream by condensation, and for accumulating the resulting condensate comprising:

means for reducing the temperature of a moving gas stream comprising at least one fraction having a lower dew point than other fractions of the stream to a temperature at or below the dew point temperature of said one fraction to thereby cause said fraction to condense as liquid droplets, a housing comprising inlet means for admitting said moving gas stream and droplets and outlet means for discharging said gas stream, said gas stream having a path of movement in said housing between said inlet means and said outlet means, means in said housing for establishing an electrostatic field having lines of force extending transversely of said path of movement for moving said liquid condensate droplets transversely of said path of movement of said gaseous stream comprising an array of electrostatic points connected to a source of voltage and a conductive plate spaced from said points array, means for collecting liquid droplets propelled by said electrostatic field comprising a non-conductive belt having a surface of low adherence characteristics, and means for moving said non-conductive belt.

14. The apparatus of claim 13, and further comprising a doctor blade for removing liquid condensate from said belt, an a trough below said doctor blade for receiving liquid removed form said belt.

15. The apparatus of claim 14, and further comprising means for heating said doctor blade, and means for heating liquid in said trough.

16. The apparatus of claim 15, and means for discharging liquid from said trough.

17. Apparatus for removing liquid particular contaminants from a gaseous stream comprising:

a housing having an inlet for a moving gaseous stream, an outlet for the moving gaseous stream, a path for said gaseous stream between said inlet and said outlet, and a contaminant collection surface therein adjacent said path of said gaseous stream, means in said housing for establishing an electrostatic field having lines of force transversely of said stream for urging liquid particles therein toward said contaminant collection surface for depositing of liquid particles thereon comprising an electrostatic grid in said path connected to a source of voltage, and conductive means for conducting electricity spaced from said electrostatic grid, a belt in said housing, said contaminant collecting surface being the surface of said belt and being between said electrostatic grid and said conductive means, means for moving said belt, means for moving liquid contaminant from said contaminant collection surface, and means for receiving liquid contaminant removed from said contaminant collection surface.

18. The apparatus of claim 17, wherein said contaminant collection surface is the surface of a non-conductive belt, and said conductive means comprises a plate.

19. The apparatus of claim 17, said conductive means comprising conductive material in said belt.

20. The apparatus of claim 17, and further comprising means for enabling a heated gaseous steam including gaseous contaminants to flow into said apparatus, and means for causing at least one gaseous contaminant to condense to liquid particles.

* * * * *